United States Patent [19]
Hanes et al.

[11] Patent Number: 6,082,751
[45] Date of Patent: Jul. 4, 2000

[54] STEP STRUCTURE FOR RECREATIONAL VEHICLES AND THE LIKE

[75] Inventors: Fred E. Hanes, Muldrow, Okla.; Allen M. Williams, Van Buren, Ark.

[73] Assignee: Hickory Springs Manufacturing Co., Hickory, N.C.

[21] Appl. No.: 08/839,693

[22] Filed: Apr. 15, 1997

Related U.S. Application Data

[60] Provisional application No. 60/016,026, Apr. 23, 1996, and provisional application No. 60/025,259, Sep. 7, 1996.

[51] Int. Cl.$^7$ ..................................................... B60R 3/02
[52] U.S. Cl. ........................... 280/163; 280/169; 280/166
[58] Field of Search ..................................... 280/163, 166, 280/169, 43.24; 182/91, 98; 296/62

[56] References Cited

U.S. PATENT DOCUMENTS

| | | |
|---|---|---|
| 3,645,557 | 2/1972 | Aldropp et al. . |
| 3,833,240 | 9/1974 | Weiler . |
| 3,955,827 | 5/1976 | Wonigar . |
| 4,110,673 | 8/1978 | Nagy et al. . |
| 4,116,457 | 9/1978 | Nerem et al. ............................ 280/166 |
| 4,264,084 | 4/1981 | Telles . |
| 4,606,790 | 8/1986 | Youngs et al. . |
| 4,623,160 | 11/1986 | Trudell . |
| 4,982,974 | 1/1991 | Guidry ................................. 280/164.2 |
| 5,028,063 | 7/1991 | Andrews . |
| 5,505,476 | 4/1996 | Maccabee ............................... 280/166 |
| 5,803,475 | 9/1998 | Dick ....................................... 280/163 |

FOREIGN PATENT DOCUMENTS

| | | | |
|---|---|---|---|
| 217467 | 4/1987 | European Pat. Off. ............... | 280/166 |
| 2670445 | 6/1992 | France ................................... | 280/166 |
| 404342629 | 11/1992 | Japan ..................................... | 280/166 |
| 405310081 | 11/1993 | Japan ..................................... | 280/166 |

*Primary Examiner*—Anne Marie Boehler
*Assistant Examiner*—Bridget Avery
*Attorney, Agent, or Firm*—Kennedy Covington Lobdell & Hickman LLP

[57] ABSTRACT

An extendable and retractable step structure mounted to a recreational or like vehicle to facilitate passenger ingress and egress. The step structure basically includes a frame mountable to the vehicle beneath a doorway or other passenger ingress-egress location, at least one step tread and a movable linkage arrangement supporting the step tread from the frame for controlled movement between a retracted position wherein the step tread and the linkage arrangement are withdrawn into frame and an extended position wherein the step tread and the linkage arrangement are extended outwardly from the frame. Four embodiments are disclosed, two being equipped with a single step tread, a third having two step treads, and a fourth having three step treads, for selective use in differing vehicles having differing above-road elevations.

17 Claims, 20 Drawing Sheets

STEP STRUCTURE FOR RECREATIONAL VEHICLES AND THE LIKE

CROSS-REFERENCE TO RELATED PROVISIONAL APPLICATIONS

The following disclosure is based upon and claims priority from U.S. Provisional patent application Ser. No. 60/016,026, filed Apr. 23, 1996, entitled FOLDING STEP STRUCTURE FOR RECREATIONAL VEHICLES AND THE LIKE, and U.S. Provisional patent application Ser. No. 60/025,259, filed Sep. 7, 1996, entitled EXTENDABLE AND RETRACTABLE STEP STRUCTURE FOR RECREATIONAL VEHICLES AND THE LIKE.

BACKGROUND OF THE INVENTION

The present invention relates generally to folding, extending and retracting type step structures and more particularly to step structures particularly adapted for use with recreational vehicles such as motor homes, campers, vans and the like.

In such recreational vehicles of the aforementioned type, the body structure and, in turn, the passenger area of such vehicles is typically more elevated relative to the ground, roadways and parking surfaces in comparison to conventional automobiles and like passenger vehicles. Hence, it is common to provide recreational vehicles with some form of step structure to enable passengers to obtain easy ingress and egress to and from the passenger area. Typically, the step structure is mounted to the frame or body of the recreational vehicle and is configured to be selectively extended outwardly when needed for use and to be retracted into a storage position when not in use, especially when the vehicle is in motion.

Various types of mechanisms have been utilized to provide the desired extension and retraction capability to such step structures. One common form of mechanism utilizes a slide-type arrangement wherein the step structure slides within slots in a subframe or housing mounted beneath or within the vehicle frame or body, thereby to permit the step structure to extend and retract to and from a storage position. In some structures, it is also common to provide a pivoted or hinged bottom step which can thereby be moved into operative position after the step structure is fully extended. Predominantly such conventional step structures are constructed for manual operation, but other step structures utilize electric motors to facilitate automated operation.

A leading manufacturer of such recreational vehicle step structures is Elkhart Tool & Die Company, located in Elkhart, Ind. Another manufacturer of conventional step structures quite similar to those of Elkhart Tool & Die is the Archer Company, located in Traverse City, Mich. Electrically operated step structures are made by Kwikee Enterprises, Inc., of Drain, Oreg. One form of step structure made by Kwikee Enterprises is described in Nagy et al U.S. Pat. No. 4,110,673. Other patents relating to vehicle step structures are Aldropp et al U.S. Pat. No. 3,645,557; Weiler U.S. Pat. No. 3,833,240; Wonigar U.S. Pat. No. 3,955,827; Telles U.S. Pat. No. 4,264,084; Trudell U.S. Pat. No. 4,623,160; and Andrews U.S. Pat. No. 5,028,063.

SUMMARY OF THE INVENTION

It is an object of the present invention to provide an improved extendable and retractable step structure for recreational and like vehicles which is easily operable manually by means of a pivoting linkage mechanism without utilizing any slide-type structure and without the need or desirability for electric motor assistance.

Briefly summarized, and as more fully described below, the present invention basically utilizes a frame structure mountable to a vehicle frame or body in a suitable storage position for the step structure and with a coordinated arrangement of mechanical links pivoted together so as to move one or more steps through a controlled range of motion between a retracted position wherein the step or steps are withdrawn into the frame and an extended position wherein the step or steps are extended outwardly and downwardly from the frame in operative disposition for use by vehicle passengers to obtain ingress and egress to the vehicle passenger area. Three embodiments of step structures according to the present invention are disclosed, one embodiment comprising a step structure equipped with a single extendable and retractable step, a second embodiment having a step structure with two steps arranged for extension and retraction relative to the frame, and a third embodiment of step structure having three steps connected for coordinated relative movement for retraction into and extension outwardly from the frame. In all embodiments having two or more steps, the linkage mechanism is arranged for positioning the steps in horizontally and vertically staggered relationship to one another when extended from the frame and to withdraw the steps into a folded or nested relationship within the frame when retracted.

DETAILED DESCRIPTION OF THE PREFERRED EMBODIMENT

Figure 1:
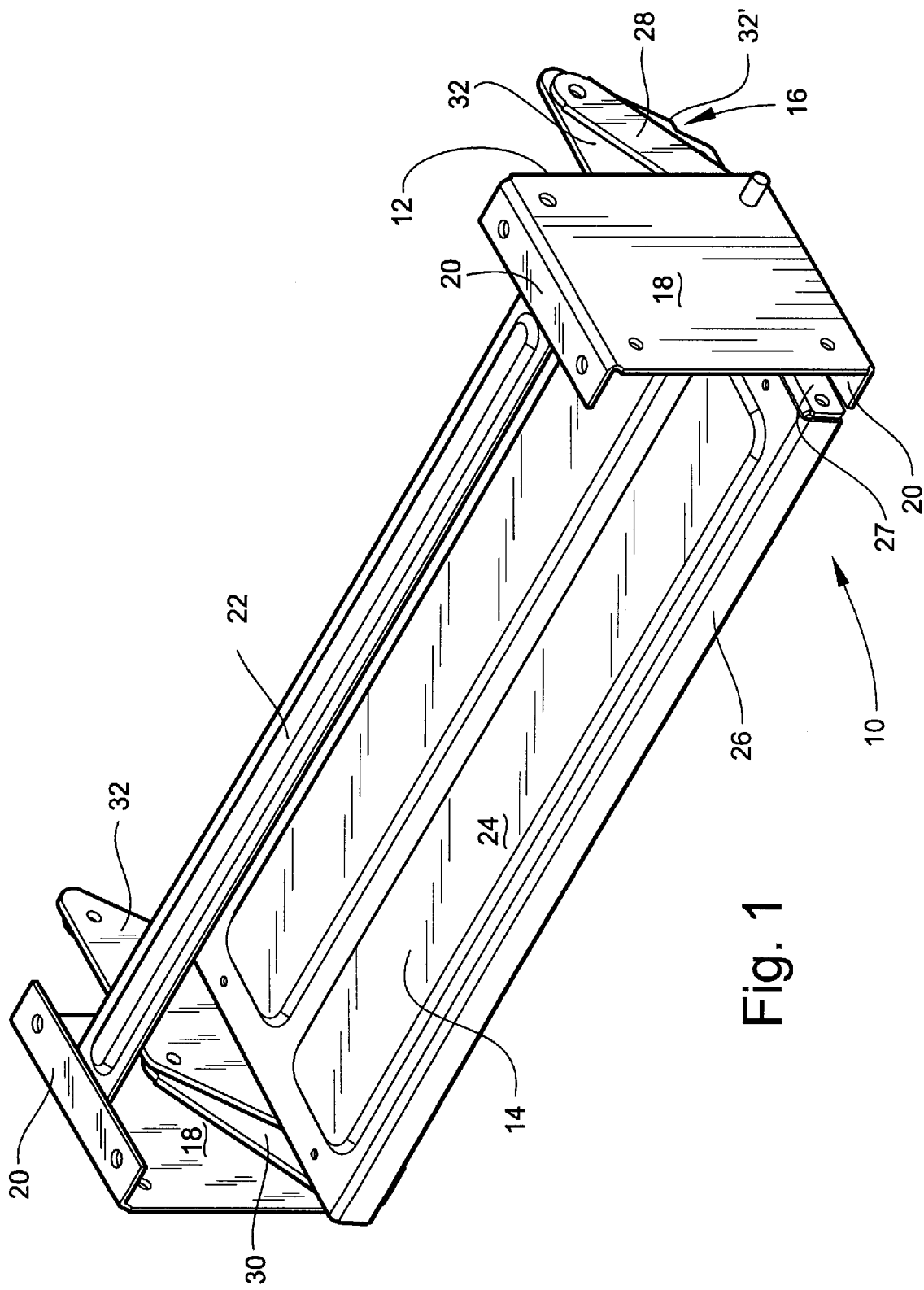
FIG. 1 is a perspective view of an extendable and retractable vehicle step mechanism according to one preferred embodiment of the present invention utilizing a single extendable and retractable step, shown in its retracted condition.
Figure 2:
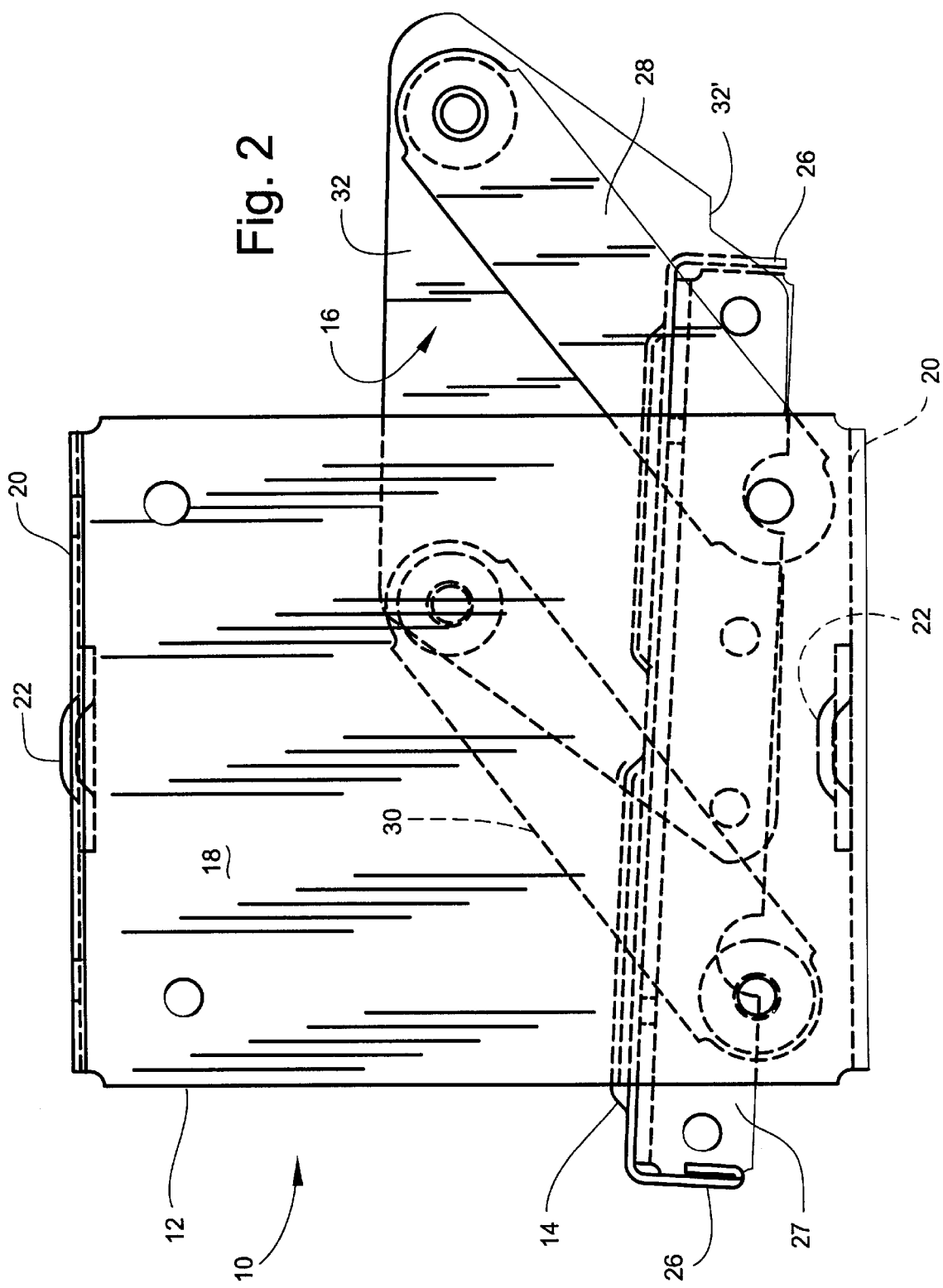
FIG. 2 is an end elevational view of the vehicle step mechanism of FIG. 1, also depicted in its retracted condition.
Figure 3:
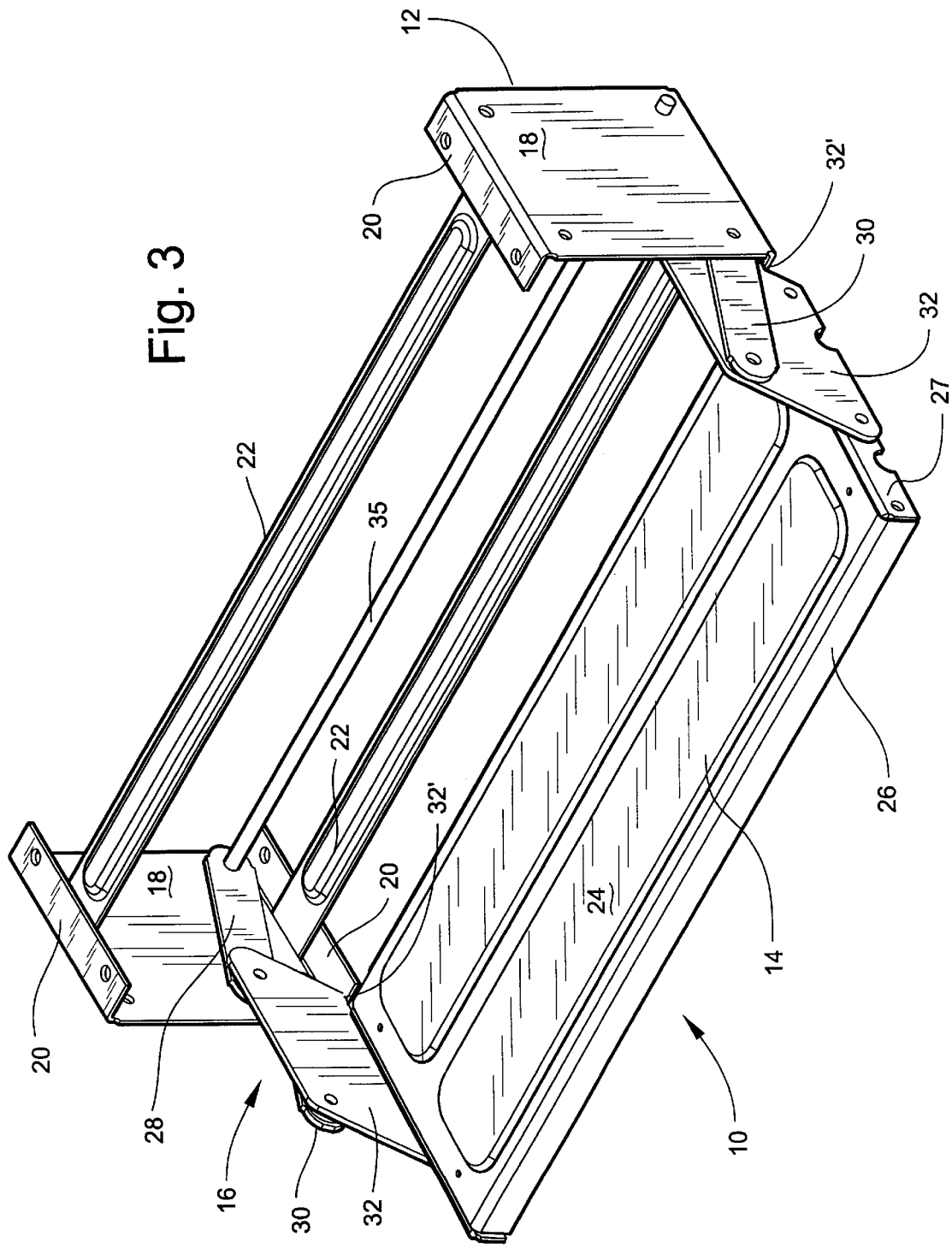
FIG. 3 is another perspective view of the present vehicle step mechanism, similar to FIG. 1, but depicted in its fully extended condition.
Figure 4:
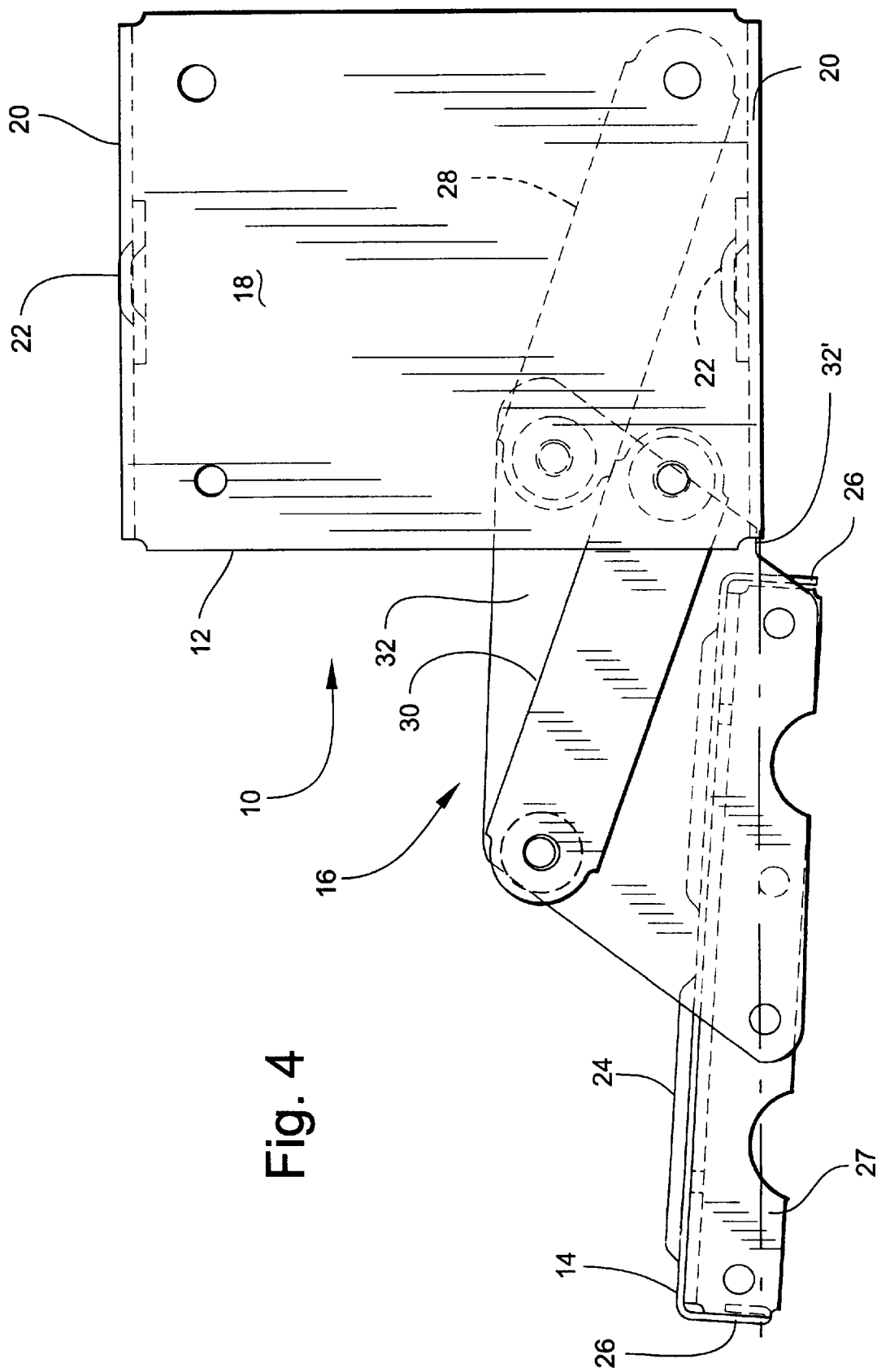
FIG. 4 is an end elevational view of the present vehicle step structure in its fully extended condition of FIG. 3.
Figure 5:
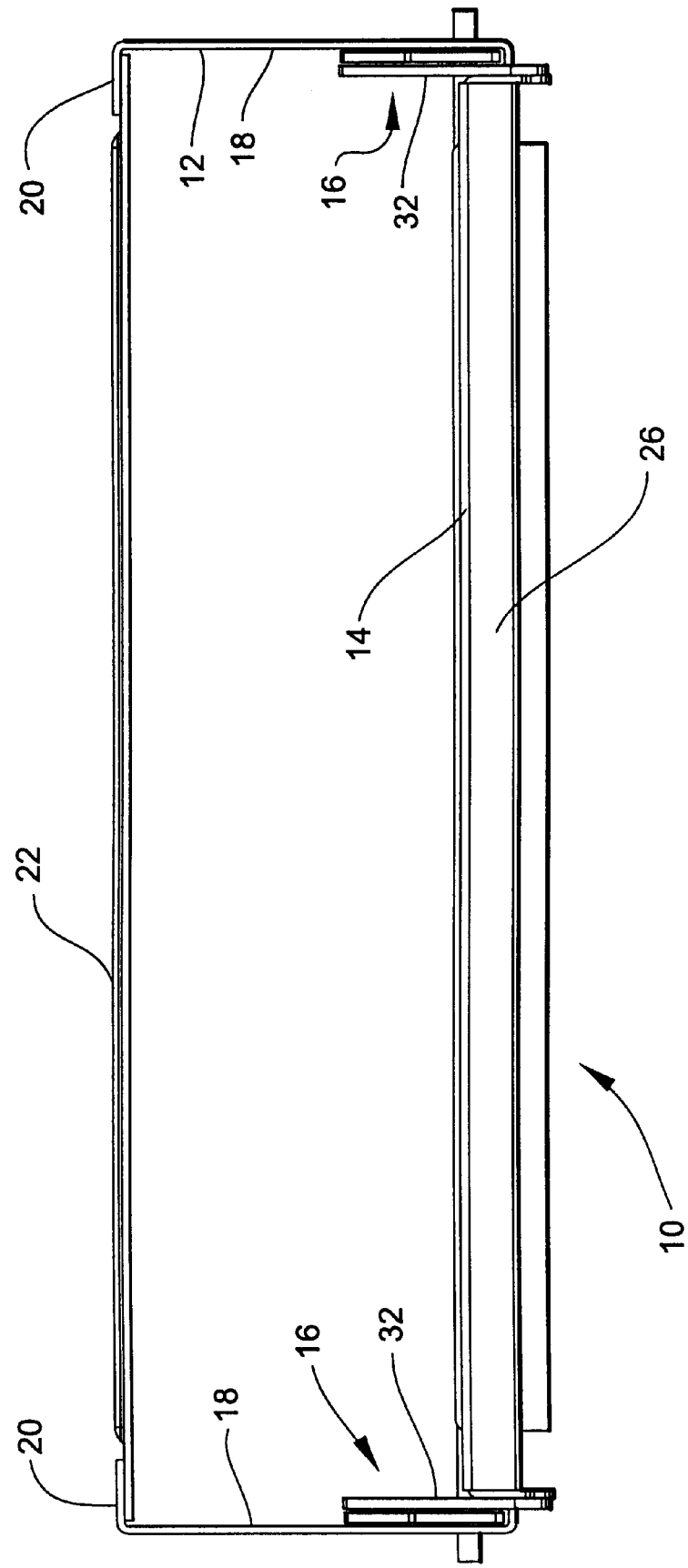
FIG. 5 is a front elevational view of the present vehicle step structure, also in its fully extended condition of FIG. 3.

Referring now to the accompanying drawings, and initially to FIGS. 1–5, one embodiment of the extendable and retractable vehicle step mechanism of the present invention is indicated generally at 10 and basically comprises a main housing or frame 12 on which a single step tread 14 is supported by a linkage system, generally indicated at 16, for controlling coordinated movement between a retracted condition, shown in FIGS. 1 and 2, wherein the step tread 14 is withdrawn into the confines of the frame 12 for storage and a fully extended condition, shown in FIGS. 3–5, wherein the step tread 14 is disposed outwardly and downwardly from the retracted condition for use.

As best seen in FIGS. 1 and 3, the frame 12 basically comprises a pair of substantially flat rigid end plates 18, each having perpendicular flanges 20 along their respective upper and lower edges, supported in spaced facing mirror image relation with their respective flanges 20 projecting toward one another, the end plates 18 being connected by transverse cross bars 22 extending laterally between and fixed at their opposite ends to the respective upper and lower flanges 20 of the end plates 18. As will be understood, the frame 12 thereby forms a rigid supporting structure for the step tread 14 and the linkage system 16 and is adapted to be fixedly mounted to the body or frame of a recreational vehicle or the like at any appropriate location at which passenger ingress and egress may be needed, e.g., directly below doorways. Of course, the particular manner and arrangement of mounting the frame may vary from one vehicle to another as necessary to adapt or conform to the particular structure of a vehicle's body or framework. Preferably, the components of the frame 12, as well as the step tread 14 and the individual links in the linkage system 16, are fabricated of a suitable metal or alloy to provide strength and rigidity, although any other material suitably providing such qualities could be utilized.

The step tread 14 in the present structure is fabricated as a flat elongate metal plate of rectangular configuration to present an upwardly facing tread surface 24, with integral front and back flanges 26 and riveted end brackets 27 extending downwardly in perpendicular relation from the respective edges of the tread surface 24 to facilitate connection of the step tread 14 to the linkage system 16, as more fully explained below. As necessary or desirable, the tread surface 24 of each step tread 14 may be formed or provided with a roughened or otherwise frictional surface to limit possible slippage of a user's feet thereon.

The linkage system 16 comprises two identical sets of individual links arranged in spaced mirror-image relation to one another and pivotably interconnected to the step tread brackets 27 at opposite sides of the frame 12 and opposite ends of the step treads 14. For sake of clarity, the linkage system 16 will be described according to one set of the individual links, as seen in the foreground in FIGS. 1 and 3, and as depicted in FIGS. 2 and 4, it being understood that an identical mirror-image set of links is provided at the opposite side of the structure 10.

Basically, the linkage system 16 at each side of the step structure 10 provides a pair of primary support links 28,30, pivotably fixed at their lower ends at a horizontal spacing to the inwardly facing surfaces of the end plates 18 adjacent their lower edges immediately above their respective flanges 20. The support links 28,30 extend upwardly in generally parallel relation and are pivotably fixed at their upper ends at a corresponding horizontal spacing to an extension bracket 32. The extension bracket 32 is of a generally parallelogram shape having horizontal upper and lower edges and angled front and rear edges. The upper ends of the support links 28,30 are pivoted along the upper edge of the extension bracket 32 and the lower edge of the extension bracket is fixed to a respective end bracket 27 of the step tread 14. The two sets of links in the linkage system are connected with one another to move in unitary coordinated manner by a connecting rod 35 rigidly fixed to each link 28 at its pivot connection to the respective end plate 18 and extending transversely between the links 28 to fix them to move in unison (see FIG. 3). In this manner, the support links 28 act in a coordinated parallelogram-type fashion as discussed below.

The operation of the step structure 10 can thus be understood. With the step structure 10 fully retracted in its folded condition into the confines of the frame 12 as shown in FIGS. 1 and 2, the forward flange 26 of the step tread 14 is accessible at the forward side of the structure 10. Upon application of a manual pulling force outwardly on the forward step flange 26, the assembly of the step 14 and the linkage system 16 begins to pivot forwardly with pivoting movement of the support links 28,30 and the extension bracket 32 to swing the step tread 14 outwardly and downwardly into a horizontal disposition forwardly of the frame 12. At the completion of such movement, the support links 28,30 come into lengthwise edge abutment with one another as shown in FIG. 4 and notches 32' in the rear edges of the extension brackets 32 come to rest on the lower flanges 20 of the frame end plates 18, thereby to rigidly orient the step tread 14 in its operative position. Following use, the step structure 10 can be retracted from this extended disposition by reversing the described sequence of steps.

Figure 6:
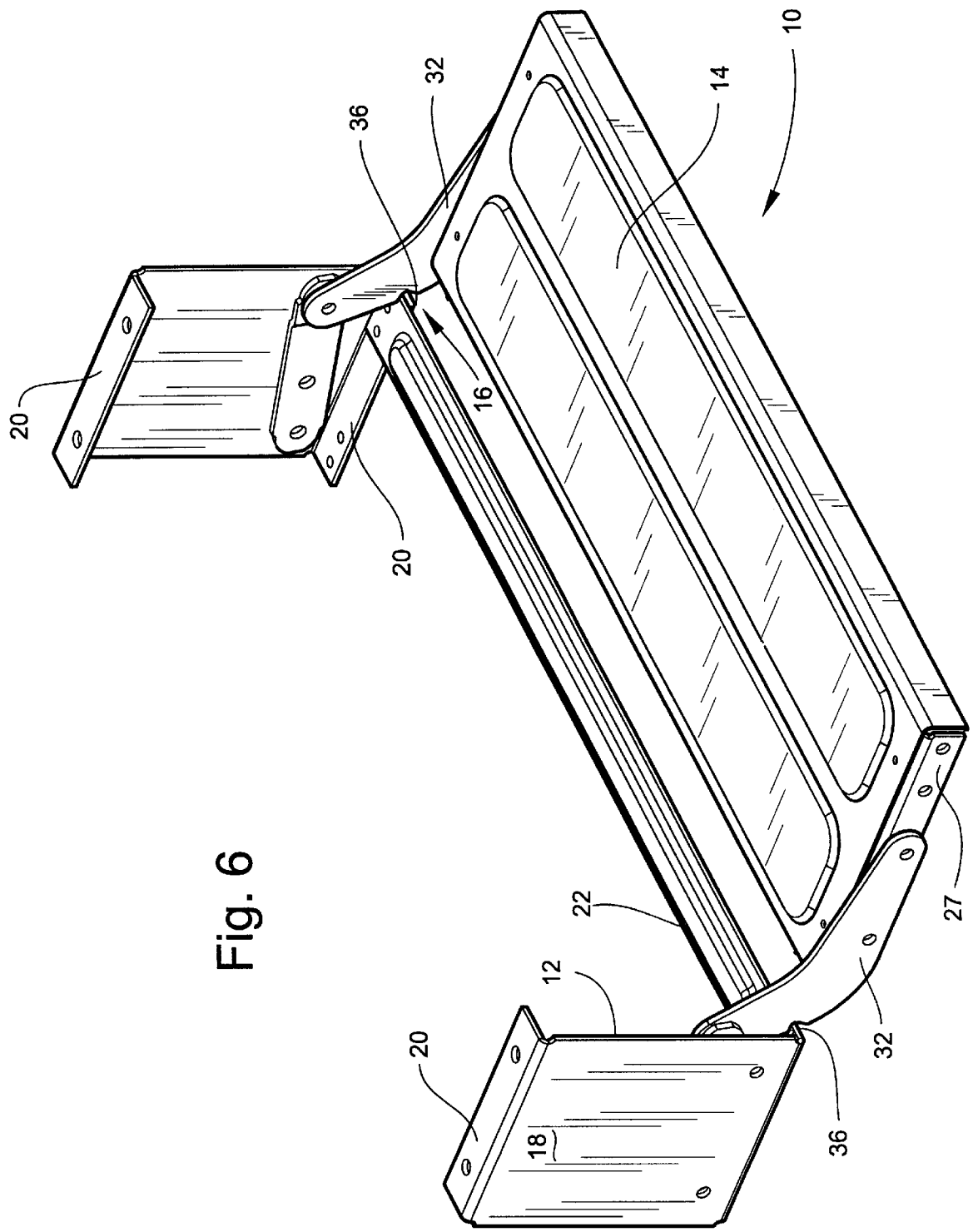
FIG. 6 is a perspective view of another extendable and retractable vehicle step mechanism according to a second preferred embodiment of the present invention utilizing a single extendable and retractable step, similar to FIG. 1, shown in its extended condition.

A modified embodiment of the extendable and retractable vehicle step mechanism of FIGS. 1–5 is shown in perspective view in FIG. 6 wherein the components of the mechanism corresponding to those of FIG. 1 are indicated by corresponding reference numerals. The step structure of FIG. 6 provides a frame 12 with flanged end plates 18 joined by a transverse cross bar 22 and a single step tread 14, all substantially identical to the embodiment of FIGS. 1–5, the step structure of FIG. 6 differing principally from FIGS. 1–5 in the provision of a modified linkage system 16 which utilizes extension brackets 32 of a modified angular shape mounted to each end of the step tread 14 and supported from the frame by only a single primary support link 28 at each side of the step structure 10. Specifically, the support links 28 are pivotably fixed at their lower ends to the respective end plates 18 directly above the rearward end of their respective flanges 20. The opposite upward ends of the support links 28 are pivoted respectively to the upper rearward ends of the angular extension brackets 32, which extend downwardly and forwardly to their opposite ends affixed to the opposite end brackets 27 of the step tread 14. As will be seen, the rearwardly facing edge of each extension bracket 32 is formed with a notch 36 adapted to engage the respective forward edges of the lower frame flanges 20 when the step tread 14 is extended, thereby to rigidly orient the step tread 14 in its operative extended position as shown in FIG. 6.

An alternative embodiment of the extendable and retractable vehicle step mechanism of the present invention is indicated generally at 110 in FIGS. 7–13. In contrast to the step structures 10 of FIGS. 1–5 and FIG. 6, the step mechanism 110 is equipped with two step treads 114, but otherwise the step mechanism 110 is similar in basic construction and operation to the step structure 10.

Figure 7:
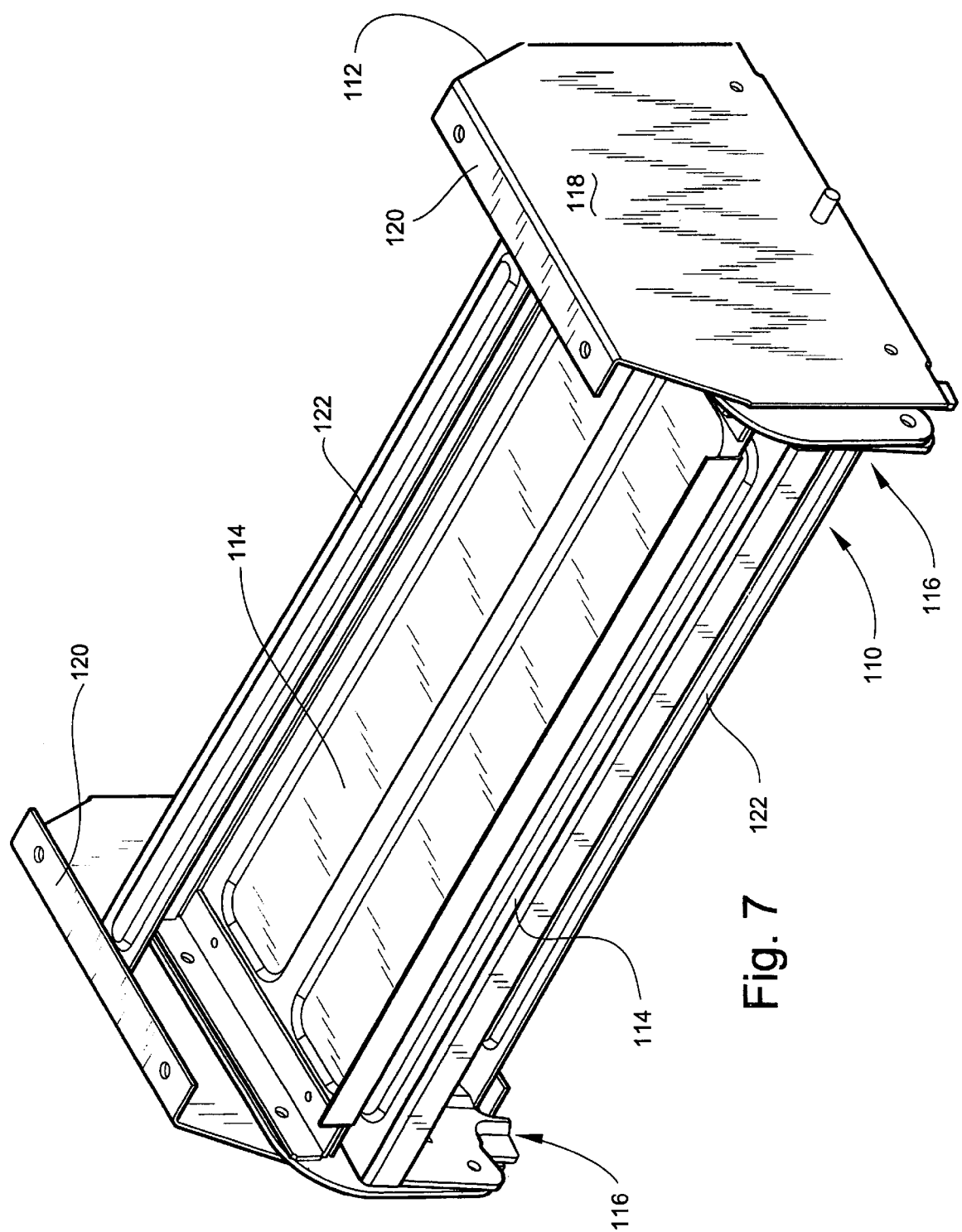
FIG. 7 is a perspective view of another extendable and retractable vehicle step mechanism according to a third preferred embodiment of the present invention utilizing two extending and retracting steps, shown in its retracted condition.
Figure 8:
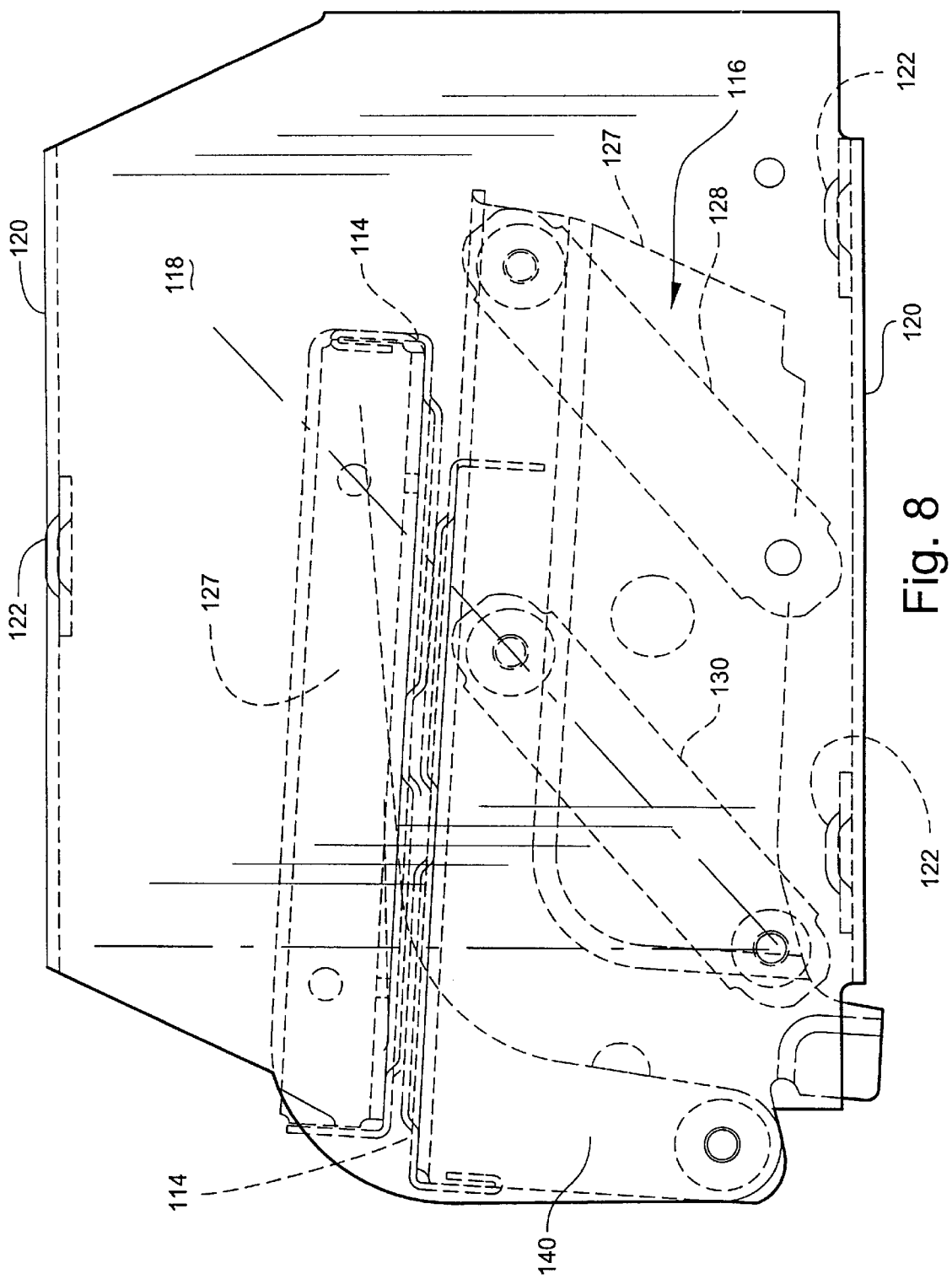
FIG. 8 is an end elevational view of the vehicle step mechanism of FIG. 7, also depicted in its retracted condition.
Figure 9:
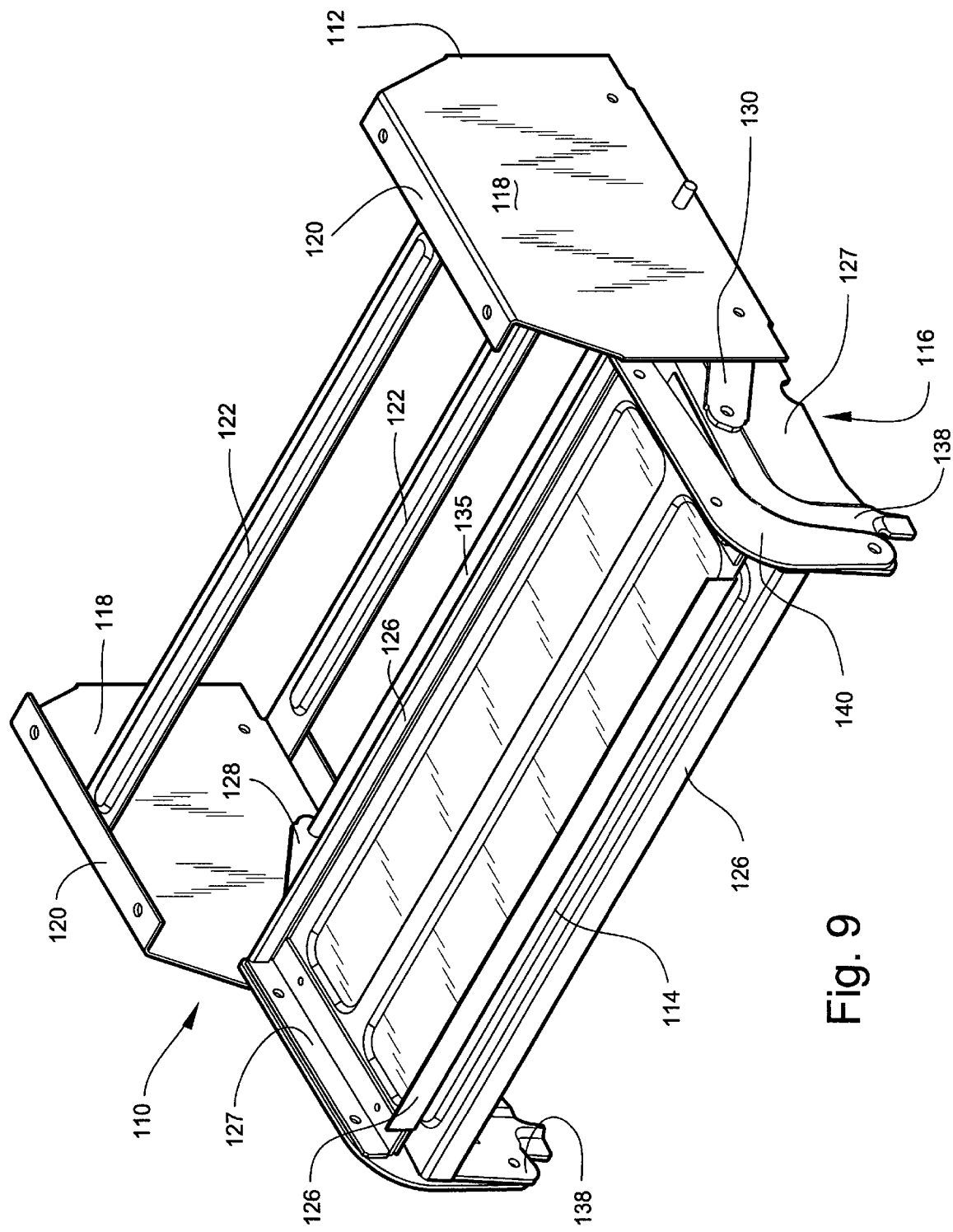
FIG. 9 is another perspective view of the vehicle step mechanism of FIG. 7, but depicted in a partially extended condition.
Figure 10:
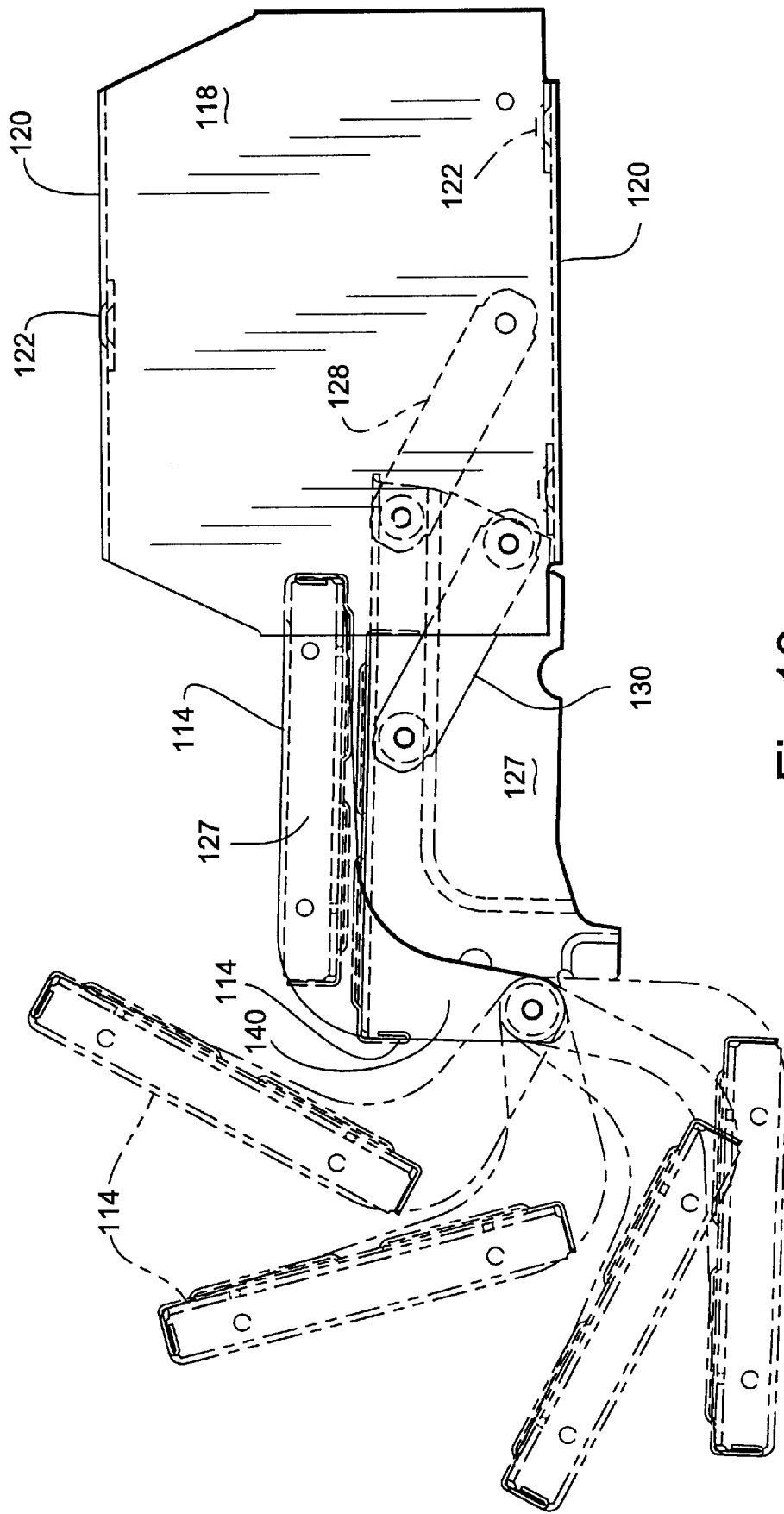
FIG. 10 is an end elevational view of the vehicle step structure of FIG. 7 depicting in full lines the partially extended condition of FIG. 9 and depicting in broken lines the further extension of the step structure into its fully extended condition.
Figure 11:
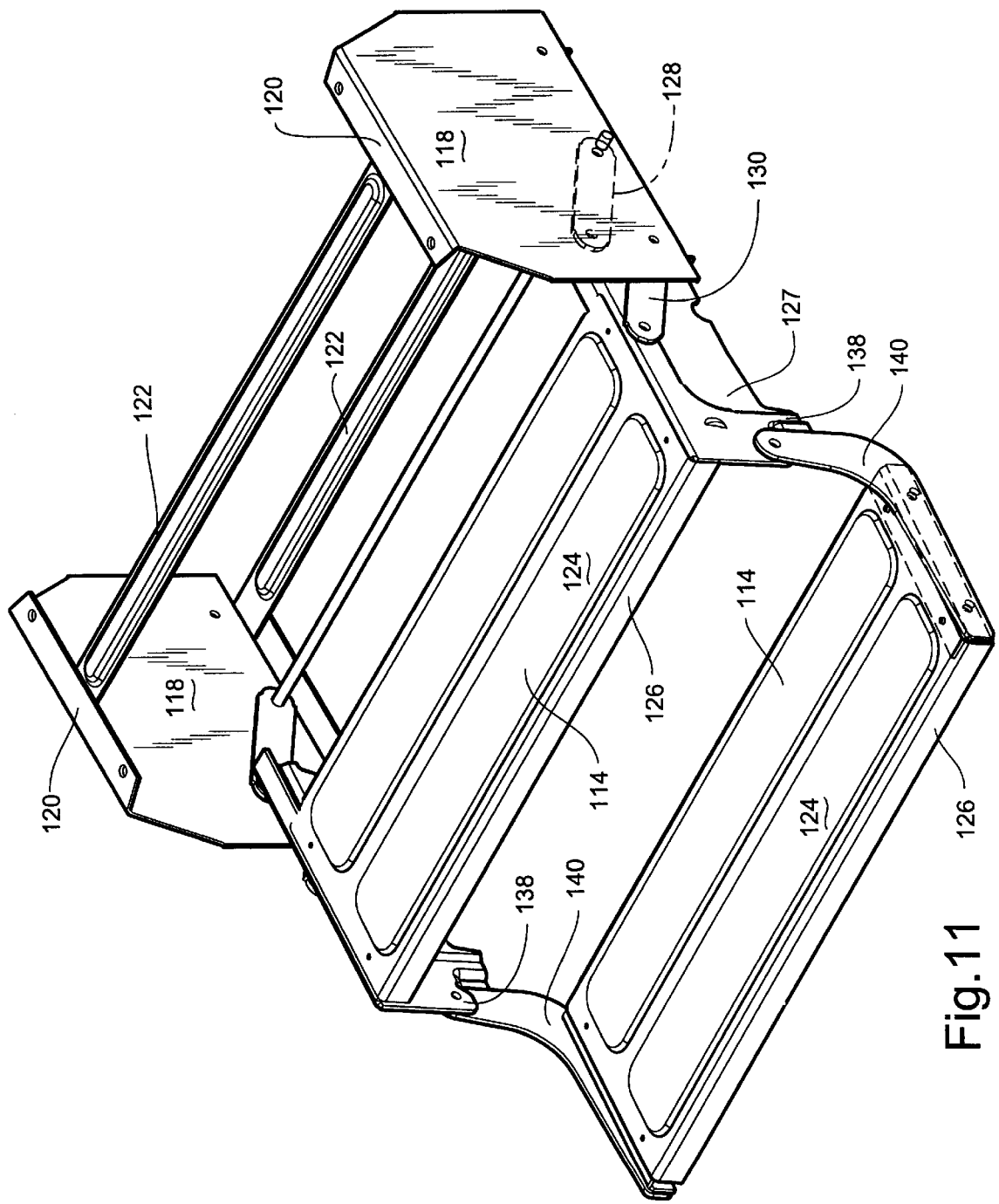
FIG. 11 is another perspective view of the vehicle step mechanism of FIG. 7 depicted in its fully extended condition.
Figure 12:
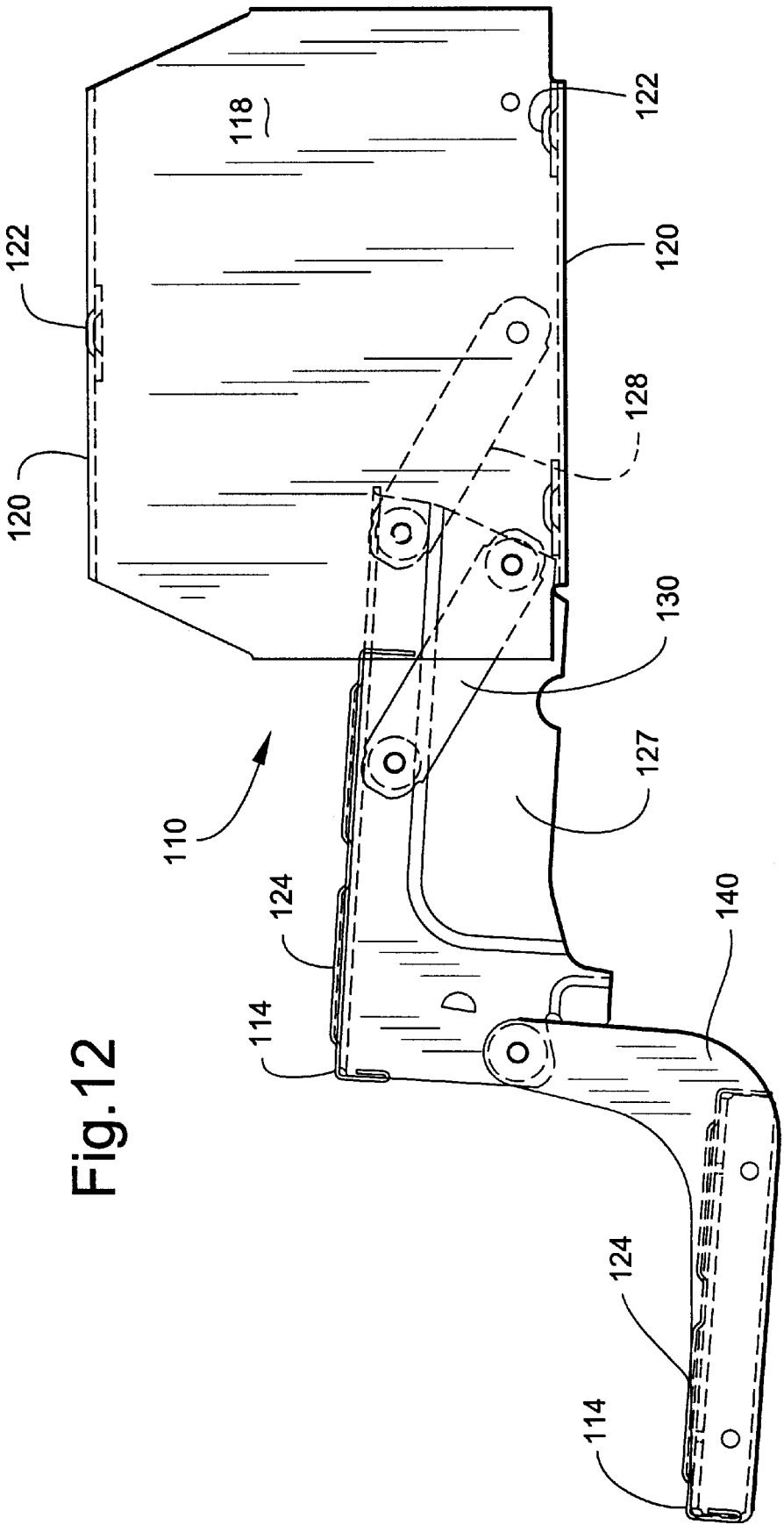
FIG. 12 is an end elevational view of the vehicle step structure of FIG. 7 in its fully extended condition of FIG. 11.
Figure 13:
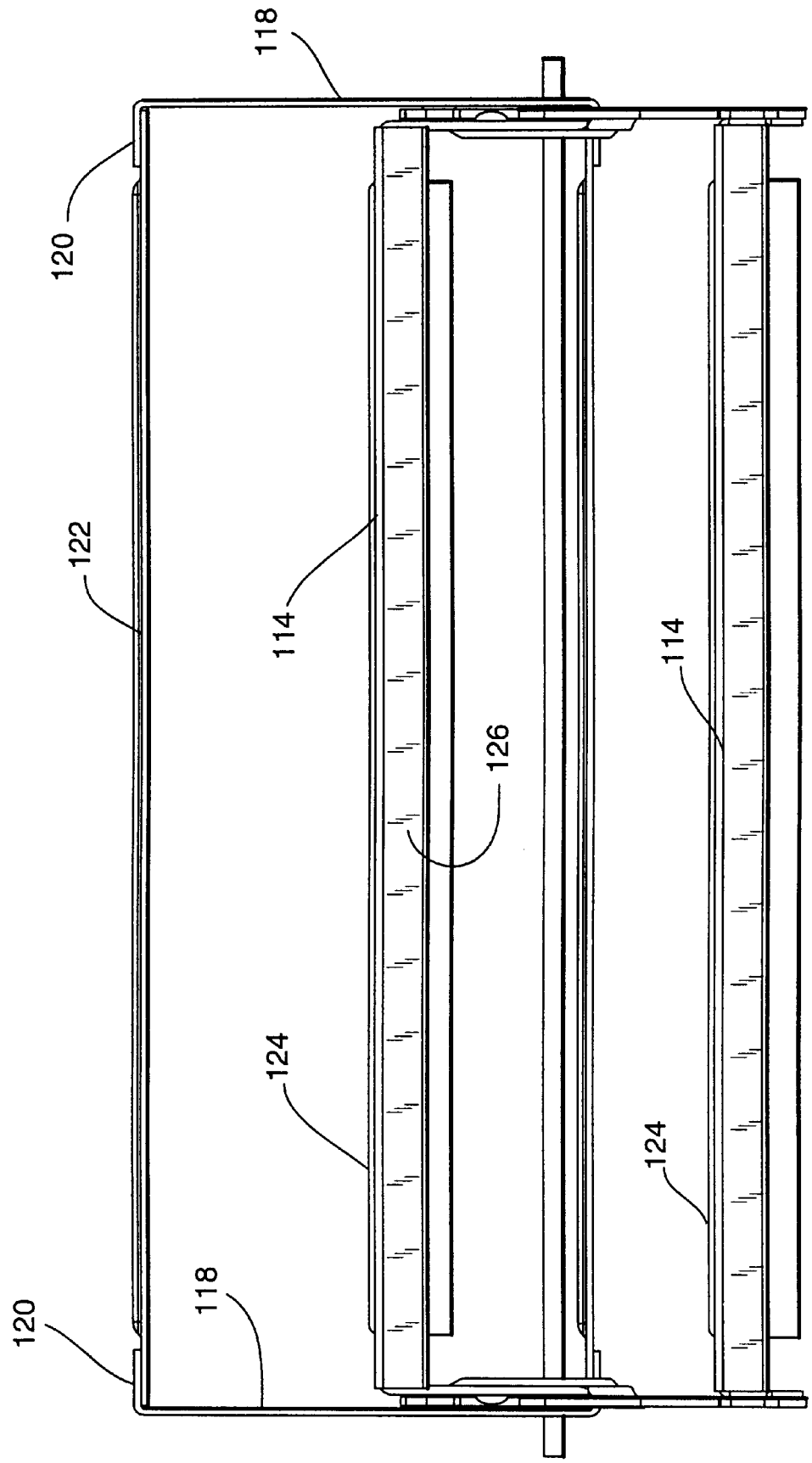
FIG. 13 is a front elevational view of the vehicle step structure of FIG. 7, also shown in its fully extended condition of FIGS. 11 and 12.

More specifically, the step structure 110 basically comprises a main housing or frame 112 on which the two step treads 114 are supported by a linkage system, generally indicated at 116 for coordinated movement between a retracted condition, shown in FIGS. 7 and 8, wherein the step treads 114 are withdrawn into the confines of the frame 112 for storage and a fully extended condition, shown in perspective view in FIG. 11, in side elevational view in FIG. 12 and in front elevational view in FIG. 13, wherein the step treads 114 are disposed in a vertically and horizontally staggered relationship for use. FIGS. 9–10 show the linkage system 116 and the step treads 114 in sequential stages during the coordinated extension movement from the retracted condition of FIGS. 7 and 8 to the extended condition of FIGS. 11–13.

As best seen in FIGS. 7, 9, and 11, the frame 112, like the frames 12 of FIGS. 1–5 and 6, basically comprises a pair of substantially flat rigid end plates 118, each having perpendicular flanges 120 along their respective upper and lower edges, supported in spaced facing mirror image relation with their respective flanges 120 projecting toward one another, the end plates 118 being connected by transverse cross bars 122 extending laterally between and fixed at their opposite ends to the respective upper and lower flanges 120 of the end plates 118. In this manner, the frame 112 forms a rigid supporting structure for the step treads 114 and the linkage system 116 which may be fixedly mounted to the body or frame of a recreational vehicle or the like at any appropriate location at which passenger ingress and egress may be needed, e.g., directly below doorways.

Each of the two individual step treads 114 in the present structure is fabricated as a flat elongate metal plate of rectangular configuration presenting an upwardly facing tread surface 124, with integral front and back flanges 126 and riveted end brackets 127 extending downwardly in perpendicular relation from the respective edges of the tread surface 124 to facilitate connection of each step tread 114 to the linkage system 116, as more fully explained below. As noted above, the tread surface 124 may be formed or provided with a roughened or otherwise frictional surface to limit possible slippage of a user's feet thereon.

The linkage system 116 comprises two identical sets of individual links disposed in mirror-image relation to one another and pivotably interconnected to the step tread flanges 126 at opposite sides of the frame 112 and opposite ends of the step treads 114. As with the embodiments of FIGS. 1–5 and 6, the linkage system 116 will be described, for sake of clarity, according to one set of the individual links, as seen in the foreground in FIG. 11, and as depicted in FIGS. 8, 10, and 12.

Basically, the linkage system 116 at each side of the step structure 110 provides a first parallelogram-type sublinkage comprised of a pair of primary support links 128,130, pivotably fixed at their lower ends at a horizontal spacing to the inwardly facing surfaces of the end plates 118 adjacent their lower edges immediately above their respective flanges 120. The support links 128,130 extend upwardly in generally parallel relation and are pivotably fixed at their upper ends at a corresponding horizontal spacing to the end brackets 127 of the uppermost step tread 114. The end brackets 127 on the upper step tread 114 include extension ears 138 projecting downwardly adjacent the forward side of the step tread 114 to support a second sublinkage comprised of a pair of generally right angular crank arms 140 pivotably affixed to the downward ends of the extension ears 138, with the lower step tread 114 being affixed by its end brackets 127 between the outward ends of the crank arms 140. A connecting rod 135 is fixed to, and extends between, the two links 128 at the opposite sides of the step structure 110 to insure that the two sets of links move in coordination with one another (see FIGS. 9 and 11).

With reference to FIGS. 7–11, the operation of the step structure 110 can thus be understood. With the step structure 110 fully retracted in its folded condition into the confines of the frame 112 as shown in FIGS. 7 and 8, the forward flange 126 of the upper step tread 114 is exposed at the forward side of the structure 110. Upon application of a manual pulling force outwardly on the flange 126, the entire assembly of the steps 114 and the linkage system 116 begins to pivot forwardly with pivoting movement of the support links 128,130 to swing the upper step tread 114 outwardly into a horizontal disposition forwardly of the frame 112. At the completion of such movement, the lower edges of the end brackets 127 of the upper step 114 come to rest on the lower flanges 120 of the frame end plates 118, thereby to rigidly orient the upper step treads 114 in its operative positions. For additional stability as needed, the forwardmost cross bar 122 can be positioned to engage and support the end brackets of the upper step 114 in such outwardly pivoted position. The lower step tread 114 is still disposed at this point above the upper step tread 114 and can be easily moved into operative position forwardly of and below the upper step tread 114 by pivoting movement of the crank arms 140 about the extension ears 138. Following use, the step structure 110 can be retracted from this extended disposition by reversing the described sequence of steps.

Figure 14:
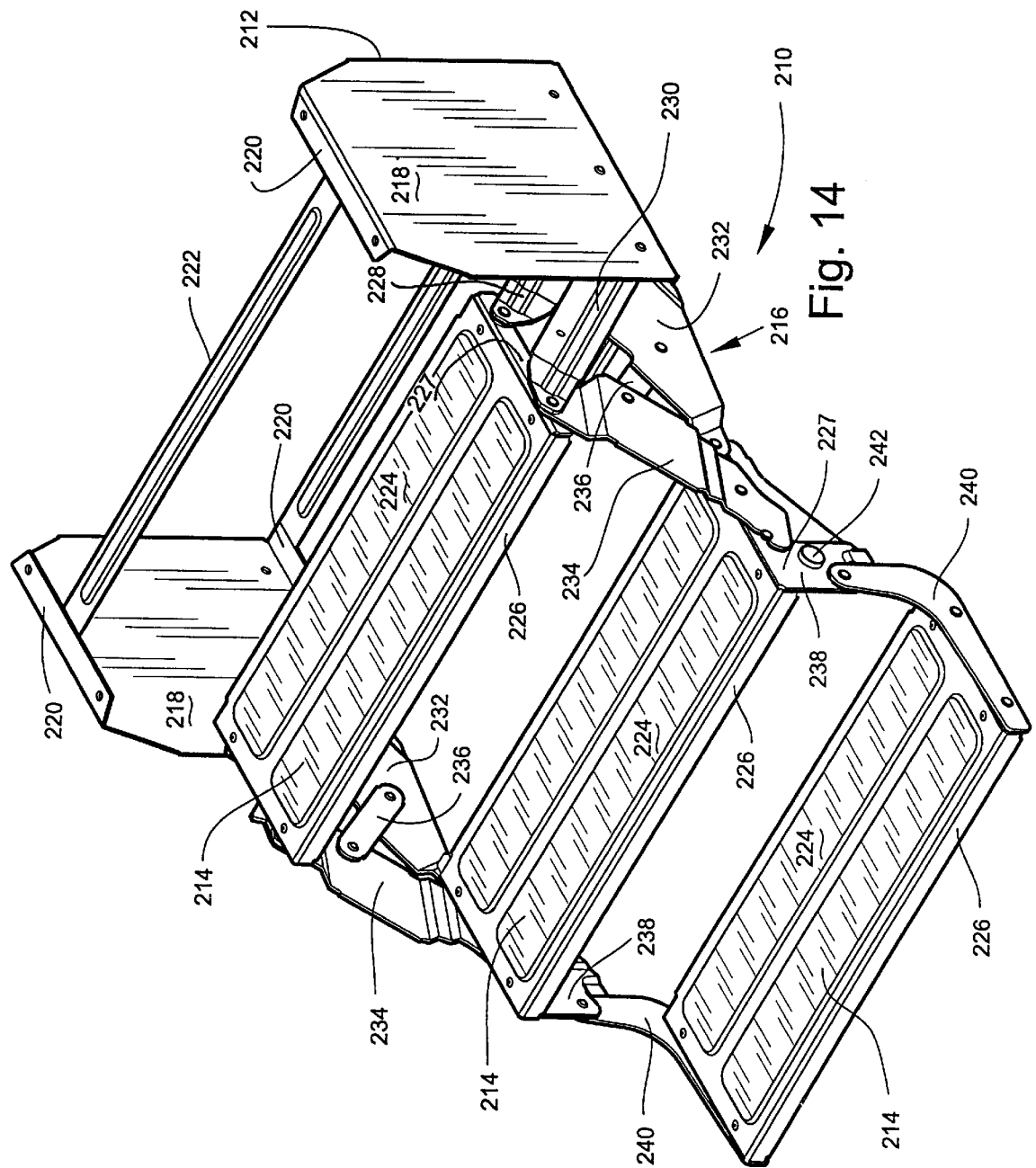
FIG. 14 is a perspective view of an extendable and retractable vehicle step mechanism according to a third preferred embodiment of the present invention utilizing three extending and retracting steps, shown in its fully extended condition.
Figure 15:
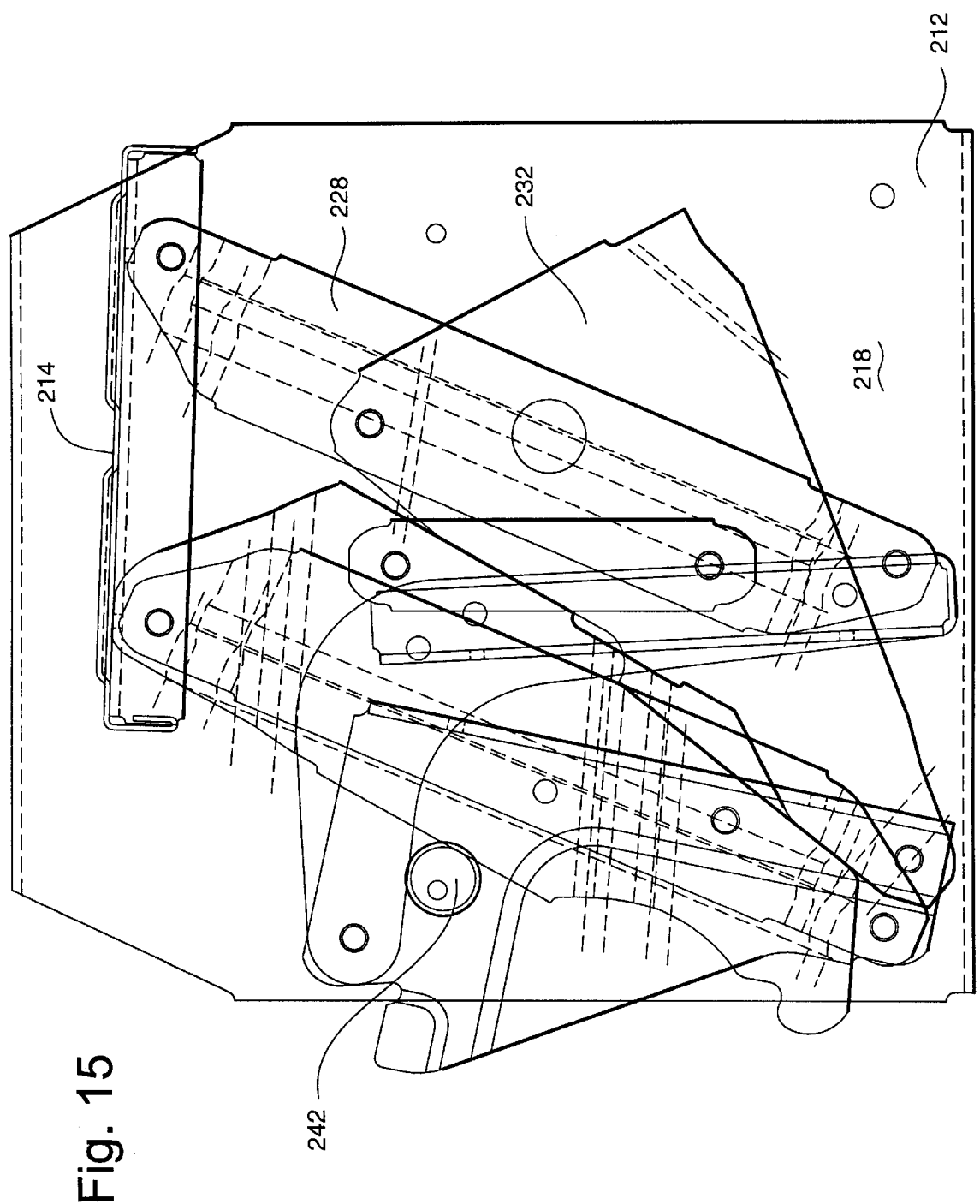
FIGS. 15–20 are side elevational views of the vehicle step mechanism of FIG. 14, depicting sequential stages in the extending movement of the step mechanism from a fully retracted condition, shown in FIG. 15, to the fully extended condition, depicted in FIG. 20.
Figure 16:
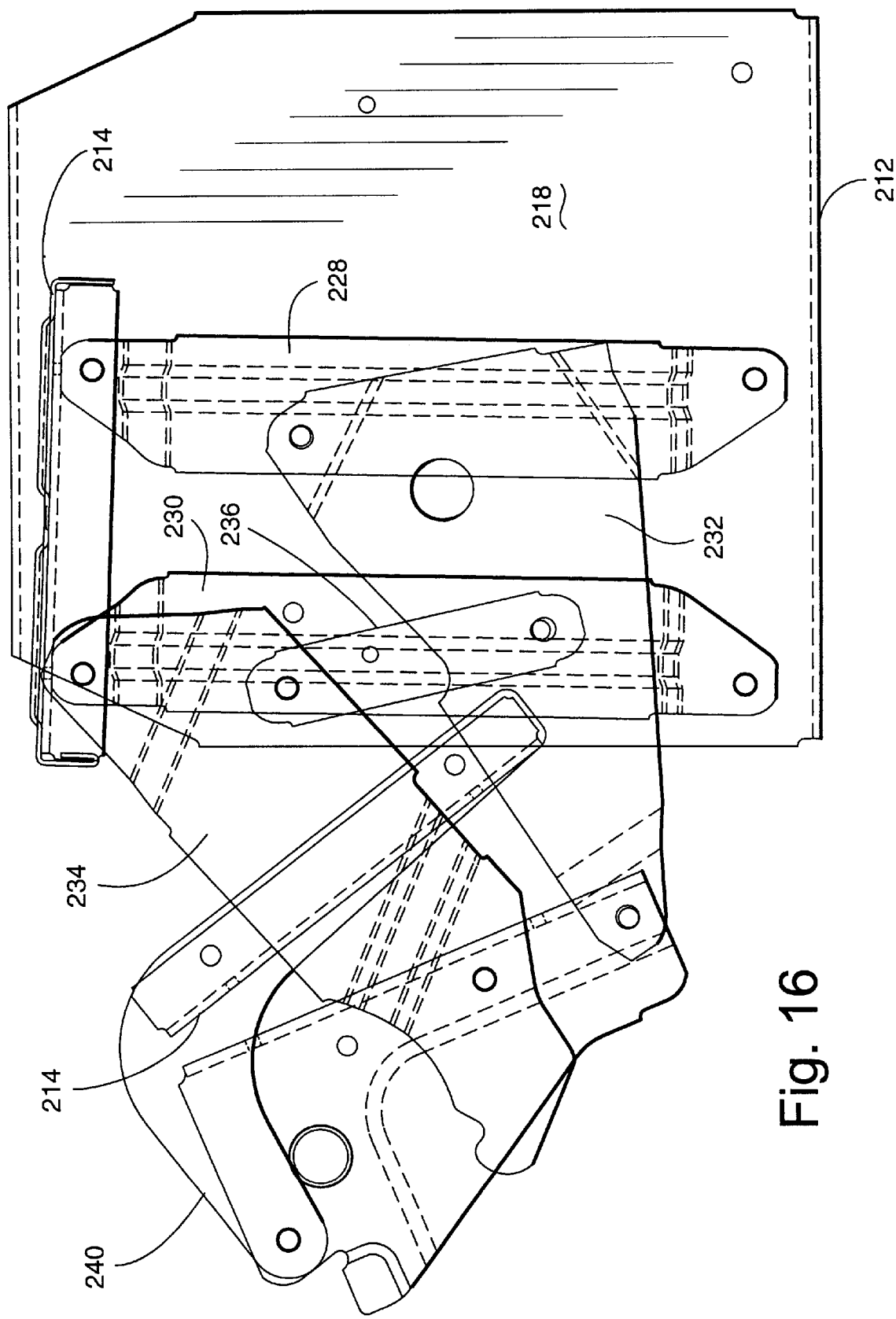
Figure 17:
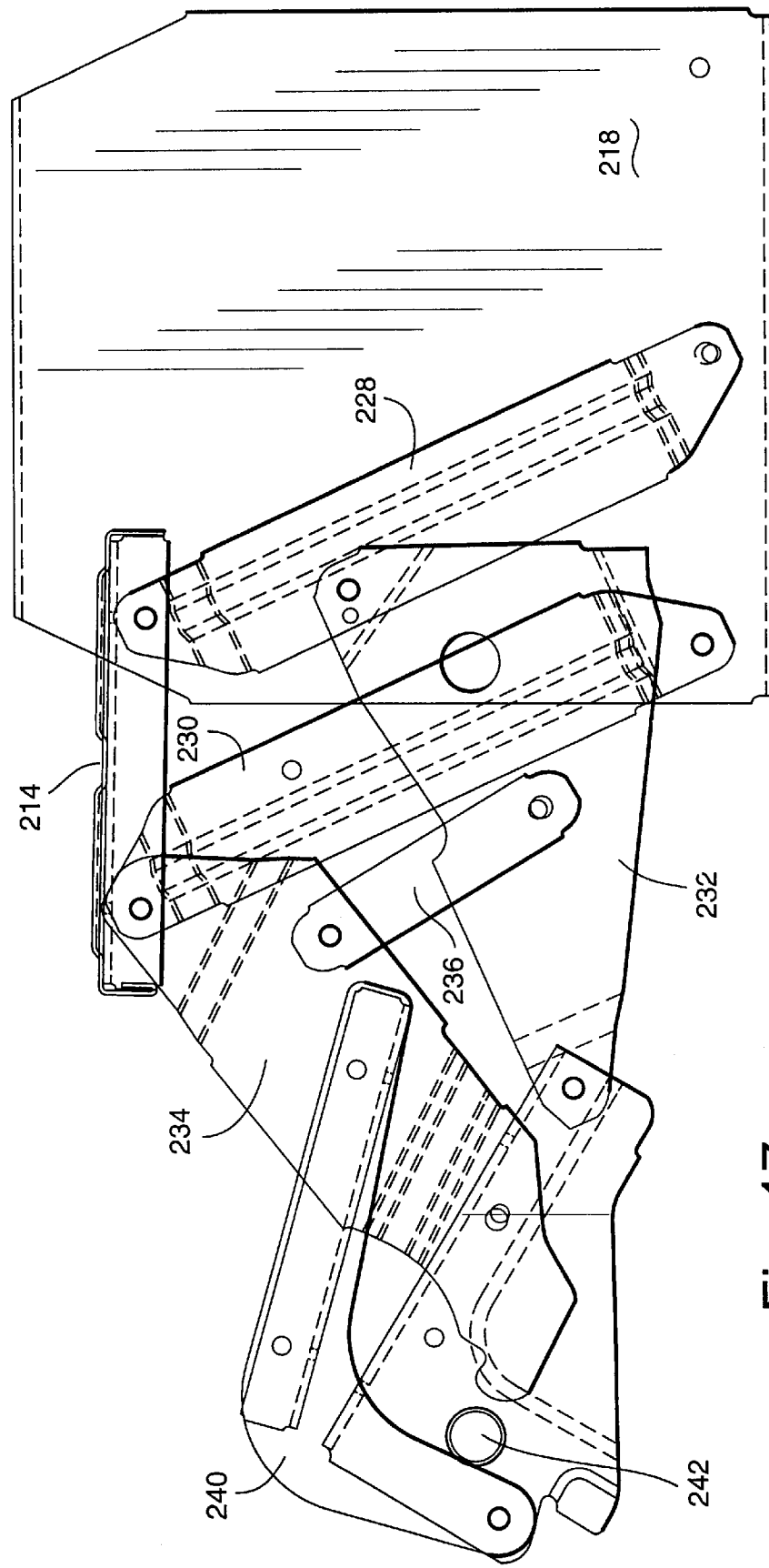
Figure 18:
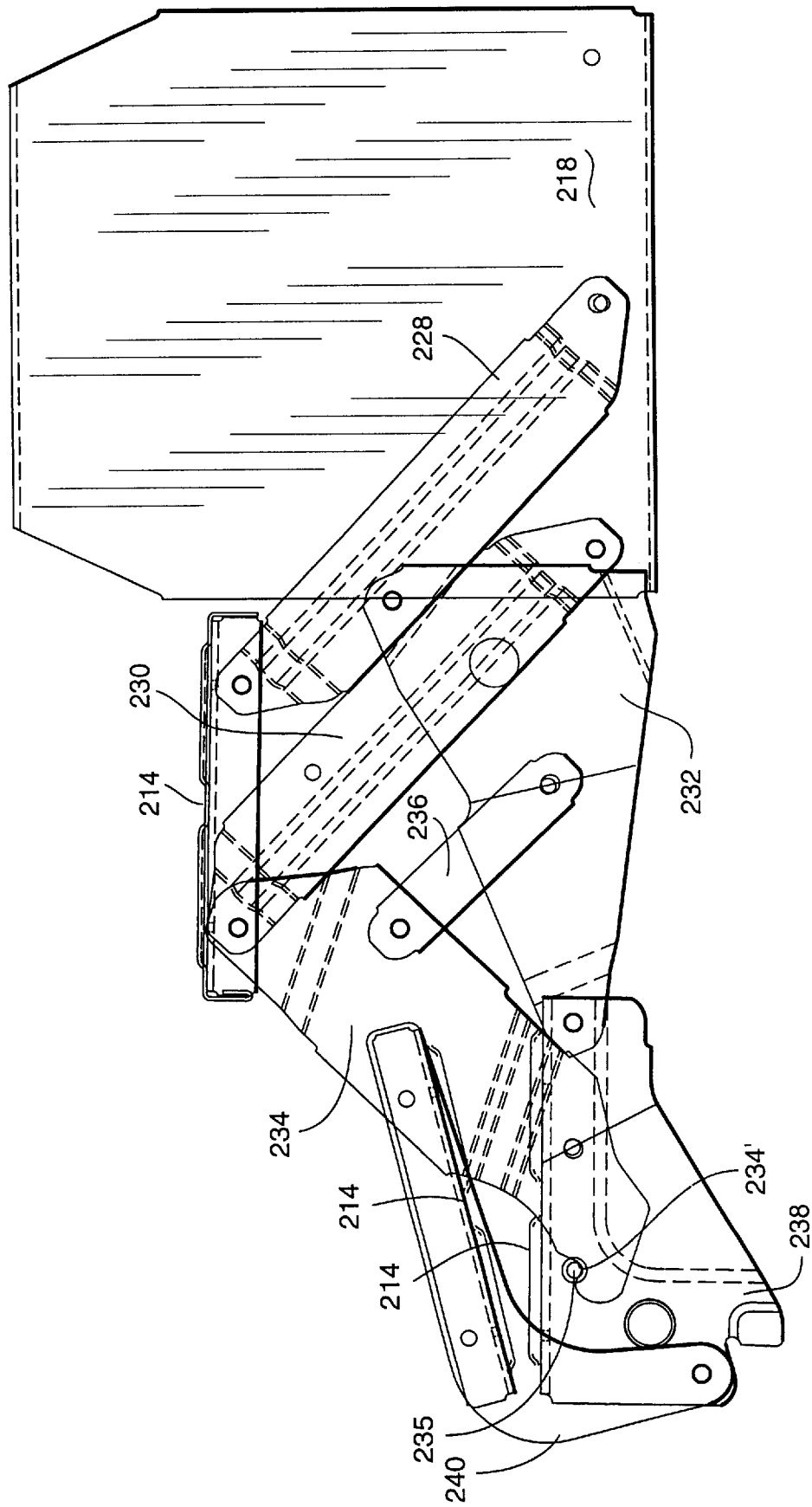
Figure 19:
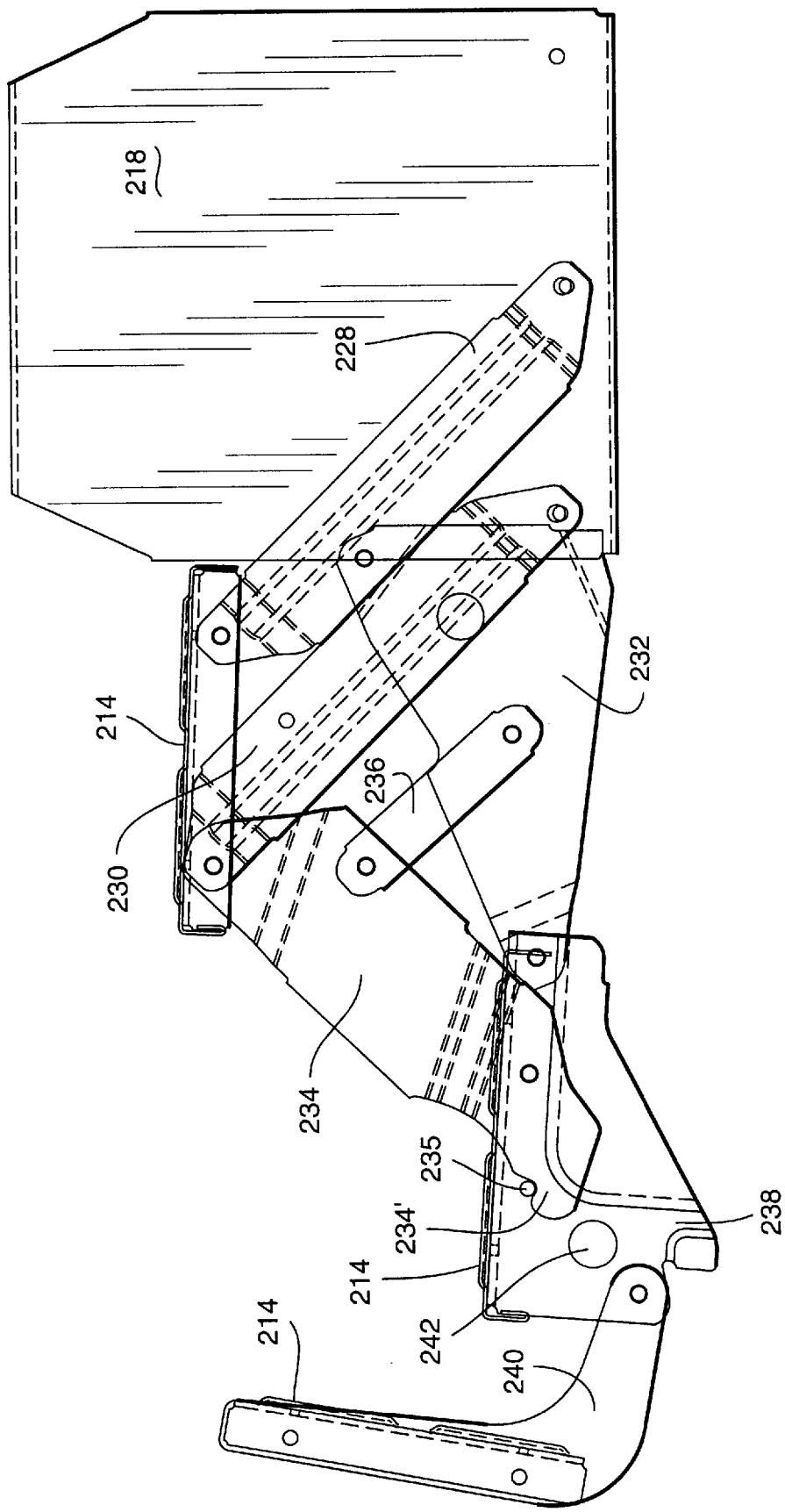
Figure 20:
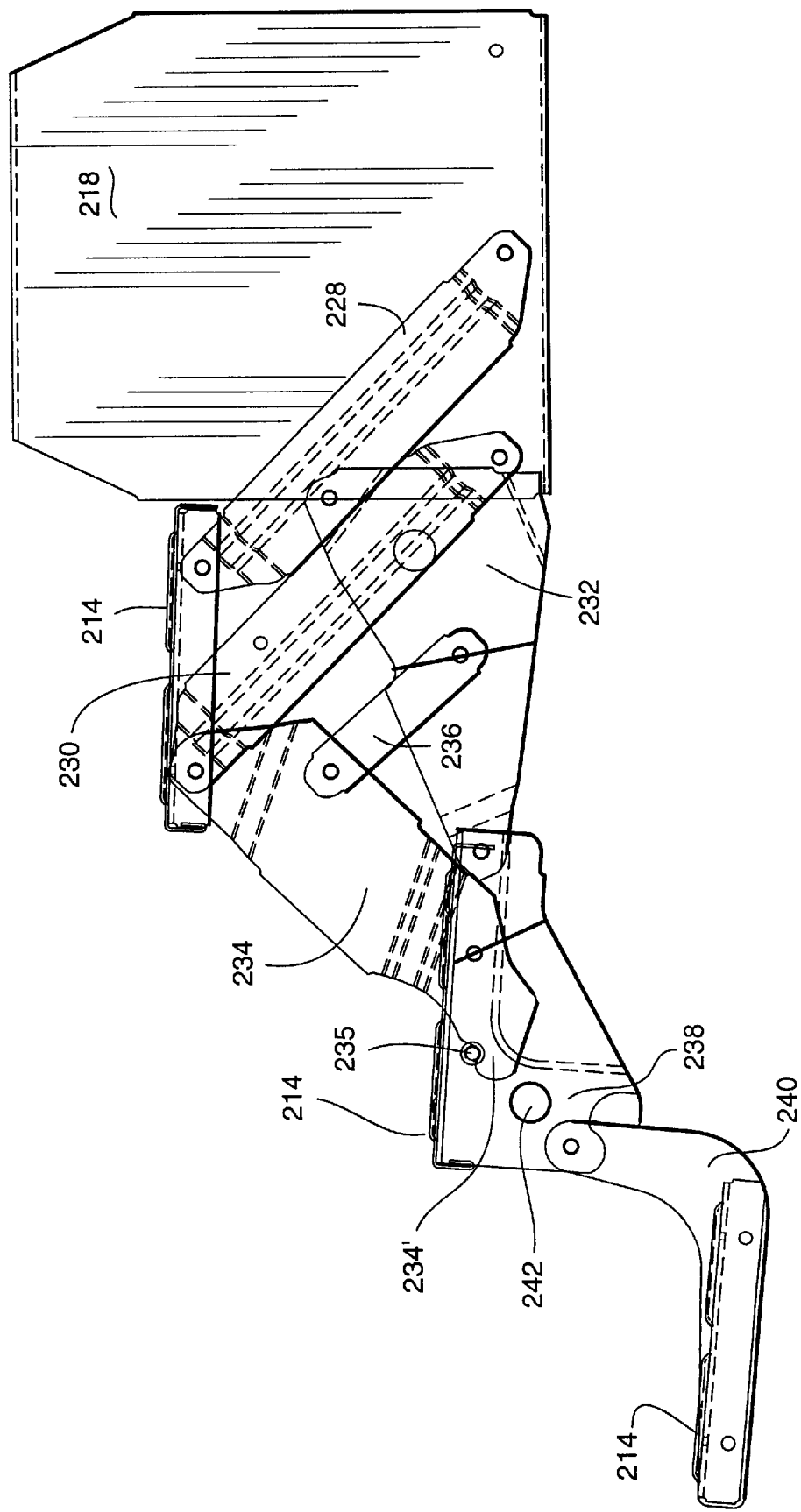

FIGS. 14–20 illustrate a fourth embodiment of the extendable and retractable vehicle step mechanism of the present invention, indicated generally at 210, which basically comprises a main housing or frame 212 on which three step treads 214 are supported by a linkage system, generally indicated at 216, for coordinated movement between a retracted condition, shown in FIG. 15, wherein the step treads 214 are withdrawn into the confines of the frame 212 for storage and a fully extended condition, shown in perspective view in FIG. 14 and in side elevational view in FIG. 20, wherein the step treads 214 are disposed in a vertically and horizontally staggered relationship for use. FIGS. 16–19 show the linkage system 216 and the step treads 214 in various sequential stages during the coordinated extension movement from the retracted condition of FIG. 15 to the extended condition of FIG. 20.

As best seen in FIG. 14, the frame 212 is substantially similar to that of FIGS. 1–5, FIG. 6, and FIGS. 7–13, comprising a pair of substantially flat rigid end plates 218, each having perpendicular flanges 220 along their respective upper and lower edges, connected in spaced facing mirror image relation with their respective flanges 220 projecting toward one another by transverse cross bars 222 extending laterally between and fixed at their opposite ends to the respective upper and lower flanges 220 of the end plates 218, the frame 212 thereby forming a rigid supporting structure for the step treads 214 and the linkage system 216 adapted to be fixedly mounted to a suitable location on the body or frame of a recreational vehicle or the like. The particular manner and arrangement of mounting the frame 212 may vary from one vehicle to another as necessary to adapt or conform to the particular structure of a vehicle's body or framework. As with the above-described embodiments, the components of the frame 212, the step treads 214 and the individual links in the linkage system 216 are preferably fabricated of a suitable metal, alloy, or other material to provide strength and rigidity.

Three individual step treads 214 are provided in the structure of FIGS. 14–20, each basically fabricated as a flat elongate rectangular metal plate of rectangular configuration with an upwardly facing frictional tread surface 224, integral front and back flanges 226 and riveted end brackets 227 extending downwardly in perpendicular relation from the respective edges of the tread surface 224.

The linkage system 216 comprises two identical spaced mirror image sets of individual links pivotably interconnected to the step tread flanges 226 at opposite sides of the frame 212 and opposite ends of the step treads 214. As with the foregoing embodiment, the linkage system 216 will be described according to one set of the individual links.

Basically, the linkage system 216 at each side of the step structure 210 includes a first parallelogram-type sublinkage comprised of a pair of primary support links 228,230, pivotably fixed at their lower ends at a horizontal spacing to the inwardly facing surfaces of the end plates 218 adjacent their lower edges directly above their respective flanges 220. The support links 228,230 extend upwardly in generally parallel relation and are pivotably fixed at their upper ends at a corresponding horizontal spacing to the end brackets 227 of the uppermost step tread 214. A second sublinkage comprises a drive link 232, an elongate control link 234, and a connecting link 236 for supporting the middle step tread 214. The drive link 232 is of generally right triangular shape and is pivotably affixed at one apex formed by its hypotenuse side edge to an intermediate location along the rearward support link 228 and at the opposite apex along its hypotenuse side edge to a rearward location along the end bracket 227 of the middle step tread 214. The elongate control link 234 is pivotably affixed at one end to the end bracket 227 of the upper step tread 214 coaxially with the forward support link 230 and adjacent the opposite end to an intermediate location on the end bracket 227 of the middle step tread 214 forwardly of the drive link 232. The connecting link 236 is pivotably affixed to and extends between intermediate locations along the drive and control links 232,234. The end brackets 227 on the middle step tread 214 include extension ears 238 projecting downwardly adjacent the forward side of the step tread 214 to support a third sublinkage comprised of a pair of generally right angular crank arms 240 pivotably affixed to the downward ends of the extension ears 238, with the lower step tread 214 being affixed by its end brackets 227 between the outward ends of the crank arms 240.

With reference to FIGS. 15–20, the operation of the step structure 210 can thus be understood. With the step structure 210 fully retracted in its folded condition into the confines of the frame 212 as shown in FIG. 15, a handle bar 242 extending between the extension ears 238 along the underside of the middle step tread 214 is accessible at the forward side of the structure 210. Upon application of a manual pulling force outwardly on the handle bar 242, the entire assembly of the steps 214 and the linkage system 216 begins to pivot forwardly with pivoting movement of the support links 228,230 to swing the upper step tread 214 outwardly into a horizontal disposition forwardly of the frame 212. Simultaneously, the drive, control and connecting links 232,234,236 move the middle step tread 214 in a translatory fashion outwardly into a horizontal disposition forwardly of and below the upper step tread 214. At the completion of such movement, the support links 228,230 come into lengthwise edge abutment with one another, the lower edges of the drive links 232 come to rest on one of the transverse cross members 222 extending between the lower flanges 220 of the frame end plates 218, the lower side of the control links 234 come into abutment with the upwardly facing edges of the drive links 232, and a hook portion 234' on the lower end of each control link 234 engages a stop pin 235 on each end bracket 227 of the middle step tread 214, thereby to rigidly orient the upper and middle step treads 214 in their operative positions. The lower step tread 214 is still disposed at this point above the middle step tread 214 and can be easily moved into operative position forwardly of and below the middle step tread 214 by pivoting movement of the crank arms 240 about the extension ears 238. Following use, the step structure 210 can be retracted from this extended disposition by reversing the described sequence of steps.

As will be understood, each of the step structures 10,110, 210 provides a relatively simple, reliably stable and secure apparatus which overcomes the problems experienced with prior art vehicle step structures. Advantageously, the step structures eliminate any use or need for a pin-and-slot or other form of slide mechanism and thereby avoids potential problems associated with such mechanisms. The linkage system of the present invention provides an easy-to-operate means of extending and retracting the step structure, which should provide long service, while being substantially less expensive than motorized apparatus. Of course, as will be understood, the particular dimensions in each embodiment of the step structure, e.g., the length of the links, and the particular disposition of the individual components relative to one another can be varied as necessary to accommodate different vehicle frame structures and different vehicle elevations, without deviating from the substance of this invention.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. An extendable and retractable step structure mountable to a rereational vehicle for facilitating ingress thereto and egress therefrom, the step structure comprising a frame defining a step storage area for mounting to the vehicle beneath a passenger ingress-egress location, at least one step tread mounted between end brackets, and a movable linkage arrangement supporting the step tread from the frame for controlling movement thereof between a retracted position wherein the step tread and the linkage arrangement are withdrawn into the step storage area of the frame and an extended position wherein the step tread and the linkage arrangement are extended outwardly from the frame for use by passengers to obtain ingress and egress to and from the vehicle, the linkage arrangement comprising an extenion bracket at opposite ends of the step tread and a parallelogram arrangement comprising respective pairs of primary support links pivotably connected between opposite ends of the frame and the extension brackets.

2. An extendable and retractable vehicle step structure according to claim 1, wherein the primary support links are arranged to engage one another in the extended position.

3. An extendable and retractable vehicle step structure according to claim 1, wherein the extension brackets are arranged to engage the frame in the extended position.

4. An extendable and retractable step structure mountable to a recreational or like vehicle for facilitating ingress thereto and egress therefrom, the step structure comprising a frame defining a step storage area for mounting to the vehicle beneath a passenger ingress-egress location, a plurality of step treads, and a movable linkage arrangement supporting the step tread from the frame for controlling movement thereof between a retracted position wherein the step tread and the linkage arrangement are withdrawn into the step storage area of the frame and an extended position wherein the step tread and the linkage arrangement are extended outwardly from the frame for use by passengers to obtain ingress and egress to and from the vehicle, the linkage arrangement having a first sublinkage between the frame and a first one of the step treads and a second sublinkage between the first step tread and a second one of the step treads, the first sublinkage comprising a parallelogram arrangement of primary support links disposed pivotably between the frame and opposite ends of the first step tread, and the second sublinkage comprising an angular crank arm arrangement disposed pivotably between the first step tread and the second step tread.

5. An extendable and retractable vehicle step structure according to claim 4, wherein the upper step tread has end brackets arranged to engage the frame in the extended position.

6. An extendable and retractable vehicle step structure according to claim 4, wherein the linkage arrangement further comprises a third sublinkage between the second step tread and a third one of the step treads.

7. An extendable and retractable vehicle step structure according to claim 6, wherein the second sublinkage comprises a drive link arrangement disposed pivotably between the first sublinkage and the second step tread, a control link arrangement disposed pivotably between the first and second step treads, and a connecting link arrangement disposed pivotably between the drive and control link arrangements.

8. An extendable and retractable vehicle step structure according to claim 7, wherein the third sublinkage comprises an angular crank arm arrangement disposed pivotably between the first step tread and the second step tread.

9. An extendable and retractable step structure mountable to a recreational vehicle for facilitating ingress thereto and egress therefrom, the step structure comprising a frame defining a step storage area for mounting to the vehicle beneath a passenger ingress-egress location, a plurality of step treads, and a movable linkage arrangement supporting the step treads from the frame for controlling movement thereof between a retracted position wherein the step treads and the linkage arrangement are withdrawn into the step storage area of the frame and an extended position wherein the step treads and the linkage arrangement are extended outwardly from the frame for use by passengers to obtain ingress and egress to and from the vehicle, the linkage arrangement having a first sublinkage between the frame and a first one of the step treads and a second sublinkage between the first step tread and a second one of the step treads, the first sublinkage comprising a parallelogram arrangement of primary support links disposed pivotably between the frame and opposite ends of the first step tread, and the second sublinkage comprising an angular crank arm arrangement disposed pivotably between the first step tread and the second step tread.

10. An extendable and retractable vehicle step structure according to claim 9, wherein the upper step tread has end brackets arranged to engage the flame in the extended position.

11. An extendable and retractable vehicle step structure according to claim 9, wherein the linkage arrangement further comprises a third sublinkage between the second step tread and a third one of the step treads.

12. An extendable and retractable vehicle step structure according to claim 11, wherein the second sublinkage comprises a drive link arrangement disposed pivotably between the first sublinkage and second step tread, a control link arrangement disposed pivotably between the first and second step treads, and a connecting link arrangement disposed pivotably between the drive and control link arrangements.

13. An extendable and retractable vehicle step structure according to claim 12, where in the third sublinkage comprises an angular crank arm arrangement disposed pivotably between the first step tread and the second step tread.

14. An extendable and retractable step structure mountable to a recreational vehicle for facilitating ingress thereto and egress therefrom, the step structure comprising a frame defining a step storage area for mounting to the vehicle beneath a passenger ingress-egress location, a plurality of step treads, and a movable linkage arrangement supporting the step treads from the frame for controlling movement thereof between a retracted position wherein the step treads and the linkage arrangement are withdrawn into the step storage area of the frame and an extended position wherein the step treads and the linkage arrangement are extended outwardly from the frame for use by passengers to obtain ingress and egress to and frame the vehicle, the linkage arrangement having a first sublinkage between the frame and a first one of the step treads and a second sublinkage between the first step tread and a second one of the step treads, the upper step tread having end brackets arranged to engage the frame in the extended position.

15. An extendable and retractable vehicle step structure according to claim 14, wherein the linkage arrangement further comprises a third sublinkage between the second step tread and a third one of the step treads.

16. An extendable and retractable vehicle step structure according to claim 15, wherein the second sublinkage comprises a drive link arrangement disposed pivotably between the first sublinkage and the second step tread, a control link arrangement disposed pivotably between the first and second step treads, and a connecting link arrangement disposed pivotably between the drive and control link arrangements.

17. An extendable and retractable vehicle step structure according to claim 16, wherein the third sublinkage comprises an angular crank arm arrangement disposed pivotably between the first step tread and the second step tread.

* * * * *